United States Patent
Liu et al.

(10) Patent No.: US 11,843,719 B1
(45) Date of Patent: Dec. 12, 2023

(54) ANALYSIS OF CUSTOMER INTERACTION METRICS FROM DIGITAL VOICE DATA IN A DATA-COMMUNICATION SERVER SYSTEM

(71) Applicant: 8x8, Inc., San Jose, CA (US)

(72) Inventors: Zhishen Liu, San Jose, CA (US); Bryan R. Martin, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 146 days.

(21) Appl. No.: 16/288,296

(22) Filed: Feb. 28, 2019

Related U.S. Application Data

(60) Provisional application No. 62/650,652, filed on Mar. 30, 2018.

(51) Int. Cl.

| | |
|---|---|
| *H04M 3/51* | (2006.01) |
| *G10L 15/18* | (2013.01) |
| *G06Q 30/02* | (2023.01) |
| *H04L 67/306* | (2022.01) |
| *G10L 17/26* | (2013.01) |
| *G06F 40/56* | (2020.01) |

(52) U.S. Cl.
CPC .......... *H04M 3/5175* (2013.01); *G06F 40/56* (2020.01); *G06Q 30/0281* (2013.01); *G10L 15/1807* (2013.01); *G10L 17/26* (2013.01); *H04L 67/306* (2013.01); *H04M 3/5183* (2013.01)

(58) Field of Classification Search
CPC ........ G10L 15/26; G10L 7/26; H04M 3/5175; H04M 11/00
See application file for complete search history.

(56) References Cited

U.S. PATENT DOCUMENTS

| | | |
|---|---|---|
| 5,473,732 A | 12/1995 | Chang |
| 6,424,935 B1 | 7/2002 | Taylor |
| 7,003,462 B2 * | 2/2006 | Shambaugh ............ H04M 3/51 |
| | | 379/265.06 |
| 7,236,932 B1 | 6/2007 | Grajski |

(Continued)

FOREIGN PATENT DOCUMENTS

WO   WO-2014151539 A1 *   9/2014   ......... G06F 21/6245

*Primary Examiner* — Thuykhanh Le
(74) *Attorney, Agent, or Firm* — Crawford Maunu PLLC

(57) ABSTRACT

Certain aspects of the disclosure are directed to apparatuses and methods for analyzing customer-interaction metrics from digital voice data in a data-communication system. An example method includes accessing digital voice data indicative of transcribed audio conversations between a plurality of agents and customers of a remotely-situated client entity, the digital voice data including keywords and speech characteristic parameters associated with outcomes of the transcribed audio conversations. The method further includes analyzing the digital voice data to identify customer-interaction metrics including values of specific keywords and speech characteristic parameters of the digital voice data associated with particular outcomes and provide identification of particular agents for particular remotely-situated client entities that have customer-interaction metrics outside a threshold value to client data-communications server associated the particular agents, and adjusting the customer-interaction metrics using digital voice data of additional audio conversations.

19 Claims, 4 Drawing Sheets

(56) References Cited

U.S. PATENT DOCUMENTS

| | | | | |
|---|---|---|---|---|
| 8,068,588 B2* | 11/2011 | Ramanathan | H04M 1/663 | 704/260 |
| 8,126,136 B2* | 2/2012 | Tong | H04M 3/5175 | 379/265.06 |
| 8,537,983 B1* | 9/2013 | Haggerty | H04M 3/51 | 379/88.14 |
| 8,620,663 B2* | 12/2013 | Kondo | G10L 13/08 | 704/260 |
| 8,665,863 B2* | 3/2014 | Silverman | H04M 3/5175 | 379/265.06 |
| 8,804,577 B1* | 8/2014 | Kondapalli | H04N 7/15 | 370/261 |
| 9,203,652 B2 | 12/2015 | Petit-Huguenin et al. | | |
| 9,313,332 B1* | 4/2016 | Kumar | H04M 3/5166 | |
| 10,303,898 B2* | 5/2019 | Robinson | G06F 21/6263 | |
| 10,375,237 B1* | 8/2019 | Williams | H04L 67/568 | |
| 2003/0084300 A1* | 5/2003 | Koike | H04L 63/10 | 713/182 |
| 2003/0154072 A1* | 8/2003 | Young | G06F 16/40 | 704/E15.045 |
| 2004/0002970 A1* | 1/2004 | Hur | G06F 16/951 | |
| 2004/0143559 A1 | 7/2004 | Ayala | | |
| 2008/0016490 A1* | 1/2008 | Pabalate | G06Q 10/10 | 717/100 |
| 2008/0107255 A1* | 5/2008 | Geva | H04M 3/51 | 379/265.06 |
| 2009/0210228 A1* | 8/2009 | George | H04M 3/4936 | 704/251 |
| 2009/0276215 A1 | 11/2009 | Hager | | |
| 2010/0280828 A1* | 11/2010 | Fein | G10L 15/1822 | 704/E15.005 |
| 2011/0077988 A1* | 3/2011 | Cates | G06Q 30/0203 | 704/E15.001 |
| 2012/0140918 A1* | 6/2012 | Sherry | H04M 9/082 | 379/406.08 |
| 2013/0016823 A1* | 1/2013 | Odinak | G10L 17/26 | 379/265.02 |
| 2013/0039483 A1* | 2/2013 | Wolfeld | H04M 3/00 | 379/265.03 |
| 2013/0129071 A1* | 5/2013 | Teitelman | H04M 3/42221 | 379/265.06 |
| 2013/0144674 A1* | 6/2013 | Kim | G06Q 30/0267 | 705/7.19 |
| 2014/0136443 A1* | 5/2014 | Kinsey, II | G06Q 10/063116 | 705/347 |
| 2014/0140496 A1* | 5/2014 | Ripa | H04M 3/5175 | 379/265.06 |
| 2014/0140497 A1* | 5/2014 | Ripa | H04M 3/5175 | 379/265.06 |
| 2014/0168354 A1* | 6/2014 | Clavel | H04N 7/152 | 348/14.09 |
| 2014/0229866 A1* | 8/2014 | Gottlieb | H04N 7/15 | 709/204 |
| 2014/0241519 A1* | 8/2014 | Watson | H04M 3/5175 | 379/265.06 |
| 2014/0258872 A1* | 9/2014 | Spracklen | H04L 41/5067 | 715/736 |
| 2015/0195220 A1* | 7/2015 | Hawker | H04L 51/216 | 707/723 |
| 2015/0235655 A1* | 8/2015 | Dimitriadis | G10L 25/48 | 704/270 |
| 2015/0264177 A1* | 9/2015 | Feast | G10L 25/48 | 379/265.07 |
| 2015/0278225 A1* | 10/2015 | Weiss | H04M 1/72457 | 705/14.58 |
| 2015/0281436 A1* | 10/2015 | Kumar | H04M 3/5166 | 379/68 |
| 2015/0281445 A1* | 10/2015 | Kumar | H04M 3/42221 | 379/88.01 |
| 2015/0286627 A1* | 10/2015 | Chang | G06F 40/205 | 704/9 |
| 2015/0341322 A1* | 11/2015 | Levi | G06Q 30/0269 | 726/26 |
| 2016/0173693 A1* | 6/2016 | Spievak | G06Q 30/0269 | 379/265.09 |
| 2016/0239573 A1* | 8/2016 | Albert | H04L 67/306 | |
| 2016/0352907 A1* | 12/2016 | Raanani | H04M 3/5232 | |
| 2017/0187880 A1* | 6/2017 | Raanani | H04M 3/5175 | |
| 2017/0300990 A1* | 10/2017 | Tanaka | G10L 15/08 | |
| 2018/0007204 A1* | 1/2018 | Klein | H04M 3/5166 | |
| 2018/0007205 A1* | 1/2018 | Klein | H04L 67/01 | |
| 2018/0124243 A1* | 5/2018 | Zimmerman | H04M 3/5133 | |
| 2018/0165723 A1* | 6/2018 | Wright | G06F 40/30 | |
| 2019/0033957 A1* | 1/2019 | Shionozaki | G06F 16/00 | |
| 2019/0158671 A1* | 5/2019 | Feast | G06Q 10/0633 | |
| 2019/0190890 A1* | 6/2019 | Druker | G06F 21/6245 | |
| 2019/0278942 A1* | 9/2019 | Baudart | G06F 40/295 | |
| 2020/0145481 A1* | 5/2020 | Williams | H04M 3/42314 | |

\* cited by examiner

ANALYSIS OF CUSTOMER INTERACTION METRICS FROM DIGITAL VOICE DATA IN A DATA-COMMUNICATION SERVER SYSTEM

OVERVIEW

Aspects of various embodiments are directed to capturing and analyzing digital voice data in a data-communication server system such as a broadband server and/or a Voice over Internet Protocol (VoIP) system, which is used to identify an outcome of a conversation based on a tone/sentiment and/or keywords. In the following discussion, various implementations and applications are disclosed to provide an understanding of the instant disclosure by way of non-limiting example embodiments exemplified by way of VoIP-type data communications which typically involve a data-communication server communicating with an endpoint device, such as a VoIP-enabled endpoint device ("VoIP device") via a broadband network (e.g., Internet, WiFi, cellular) to connect with the data-communication server that is managed by an VoIP provider such as 8×8, Inc. and/or an Internet Service Provider (ISP) such as Yahoo or Google. Through such a server, call routing and other data communications services are managed for the endpoint device.

Computer servers are increasingly being used to provide various services over a network including, but not limited to, VoIP communications services such as VoIP calls, video conferencing, call exchange servers, packet switching, and traffic management as well as non-VoIP services including, but not limited to: website hosting, remote data storage, remote computing services, and virtual computing environments.

The use of VoIP telecommunications services has been widespread and significant in terms of both numbers of users and types of services being made available. This growth can be attributable to any of a wide variety of socio-economic changes such as the mobility of users of these services, the types and reduced costs of portable telecommunication tools, and the ever-evolving technology adapting to the personal and business needs of the telecommunications users.

SUMMARY

Various example embodiments are directed to issues such as those addressed above and/or others which may become apparent from the following disclosure concerning analyzing customer interaction metrics from digital voice data in a data-communications system.

A number of aspects are directed to a data-communications system that includes a data-communication server that interfaces with a plurality of remotely-situation client entities to provide data communication services and processing circuitry coupled to a memory circuit and to the data-communication server. The data-communications server is operated by a telecommunications provider, where the data-communications server on the data communication provider side (e.g., a VoIP provider server as commercially available services from 8×8, Inc.), is used to provide data-communication services to a multitude of client entities. The processing circuit, which can be part of or separate from the data-communication server, is in communication with the data-communications server and can analyze digital voice data that represents audio (e.g., spoken) conversations between agents of the client entities and other personnel, such as customers. For example, the processing circuitry can receive digital voice data indicative of transcribed audio conversations between a plurality of agents and customers of a remotely-situated client entity and identify keywords and speech characteristic parameters from the digital voice data and which are from the data communication services provided by the data-communications server. The speech characteristic parameters are indicative of a tone or sentiment of the transcribed audio conversations. Example speech characteristic parameters include a frequency of audio of the transcribed audio conversation, wavelength or velocity of the audio, amplitude of the audio, and a combination thereof.

The processing circuitry can provide associations of at least one of the keywords and speech characteristic parameters with outcomes of the transcribed audio conversations, and provide the associations to a client data-communications server as feedback for the outcomes of the transcribed audio conversations with the customer(s). The associations can indicate which keywords and speech characteristics have a greater probability of a negative or positive outcome, which can be defined by the entity. Each entity and/or different divisions of an entity can have different negative and positive outcomes. Example outcomes can include a sale to a customer, a renewal of a service, a discontinuation of service, resolving of an issue, not resolving an issue, and customer hang up, among other outcomes. Other example outcomes can include a change in tone or sentiment of the customer during the conversation, such as a customer that starts the conversation angry or upset and ends the conversation happy. The associations can be stored in a database as an archive that is accessible and that ties the keywords with dates of the conversations and the speech characteristic parameters of the particular transcribed audio conversations. In various specific aspects, the processing circuitry can adjust the associations over time based on further analysis of digital voice data and provide the adjustments as feedback.

A number of embodiments are directed to methods of using a data-communication apparatus. Such example aspects can include accessing, via processing circuitry in communication with a data-communications server that interfaces with a plurality of remotely situated client-entities to provide data communications services, digital voice data indicative of transcribed audio conversations between a plurality of agents and customers of at least one of the plurality of remotely-situated client entity and associated with the provided data communications services. The digital voice data includes keywords and speech characteristic parameters associated with outcomes of the transcribed audio conversations. The method further includes using the processing circuitry to: identify customer-interaction metrics from the digital voice data, the customer-interaction metrics including values of specific keywords and speech characteristic parameters of the digital voice data associated with particular outcomes; provide identification of particular agents of the at least one remotely-situated client entity that have customer-interaction metrics outside a threshold value to client data-communications servers associated the particular agents; and adjust the customer-interaction metrics using digital voice data of additional audio conversations. The adjustment can be based on different customer-interaction metrics for different categories of customers including geography, sex, time of day, market, and age of the customer.

In a number of embodiments, the method further includes providing the adjusted customer-interaction metrics to the respective client data-communications servers by the processing circuitry and/or data-communications server, and verifying the adjustment in response to receiving an input indicating approval. The different customer-interaction metrics can be based on characteristics of the particular audio conversation, including characteristics selected from the group consisting of: geographic region of the customer, sex of the customer, age of the customer, type of customer, and a combination thereof. In addition and/or alternatively, the method can further include providing feedback to an agent of the plurality of agents during a current audio conversation based on the adjusted customer-interaction metrics, including outputting a phrase to say during the current audio conversation to an endpoint device currently in use by the agent for the current audio conversation between the agent and the customer.

In accordance with various specific aspects, the method includes providing analytics of the customer-interaction metrics for a particular market as a service to a third party. Portions of the analytics can be blocked based on previous analytics provided as a service to another third party of the same particular market.

As described above, the method can include providing a respective association with at least one of the keywords and speech characteristics with the identified outcome to an agent associated with the audio conversation. The association can be stored, in response to the agent providing an input indicating the associated is incorrect or storing the indication in response to the agent providing an indication indicating the associated incorrect or not providing any indication.

A number of related aspects are directed to an apparatus including a data-communications server that interfaces with a plurality of remotely-situated client entities to provide data communications services and processing circuitry coupled to a memory circuit and in communication with the data-communications server. The processing circuitry can access digital voice data indicative of transcribed audio conversations between a plurality of agents and customers of at least one of the plurality of remotely-situated client entities, the digital voice data including keywords and speech characteristic parameters associated with outcomes of the transcribed audio conversations; identify customer-interaction metrics using the digital voice data, the customer-interaction metrics including values of specific keywords and speech characteristic parameters of the digital voice data associated with particular outcomes; identify particular agents for at least one remotely-situated client entity that have customer-interaction metrics outside a threshold value to client data-communications servers associated the particular agents; and provide feedback to at least one of the particular agents of the plurality of agents during a current audio conversation based on the customer-interaction metrics being outside a threshold value. In specific embodiments, the feedback can include outputting a phrase to say during the current audio conversation to an endpoint device currently in use by the agent for the current audio conversation between the agent and the customer as vocals or data on a screen for the agent. The feedback can be provided to at least one of the particular agents of the plurality of agents in real time and during the current audio conversation.

Additionally, the processing circuitry can adjust the customer-interaction metrics using digital voice data of additional audio conversations. The processing circuitry can provide different customer-interaction metrics based on characteristics of the particular audio conversation, including characteristics selected from the group consisting of: geographic region of the customer, sex of the customer, age of the customer, type of customer, and a combination thereof.

In a number of embodiments, the processing circuitry can identify the keywords and speech characteristic parameters from the digital voice data, the speech characteristic parameters are indicative of a tone or sentiment of the transcribed audio conversations, and are selected from the group consisting of: frequency of audio of the transcribed audio conversation, wavelength or velocity of the audio, amplitude of the audio, and a combination thereof. The processing circuitry and/or data-communications server can identify a speech characteristic parameter outside of a threshold value or a keyword that is associated with a trigger, and in response, automatically perform an action. The action can include accessing a database to identify a manager and information for bridging the manager into the audio conversation, and bridging the manager of the respective agent into the current audio conversation.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the drawings, in which.

Figure 1:
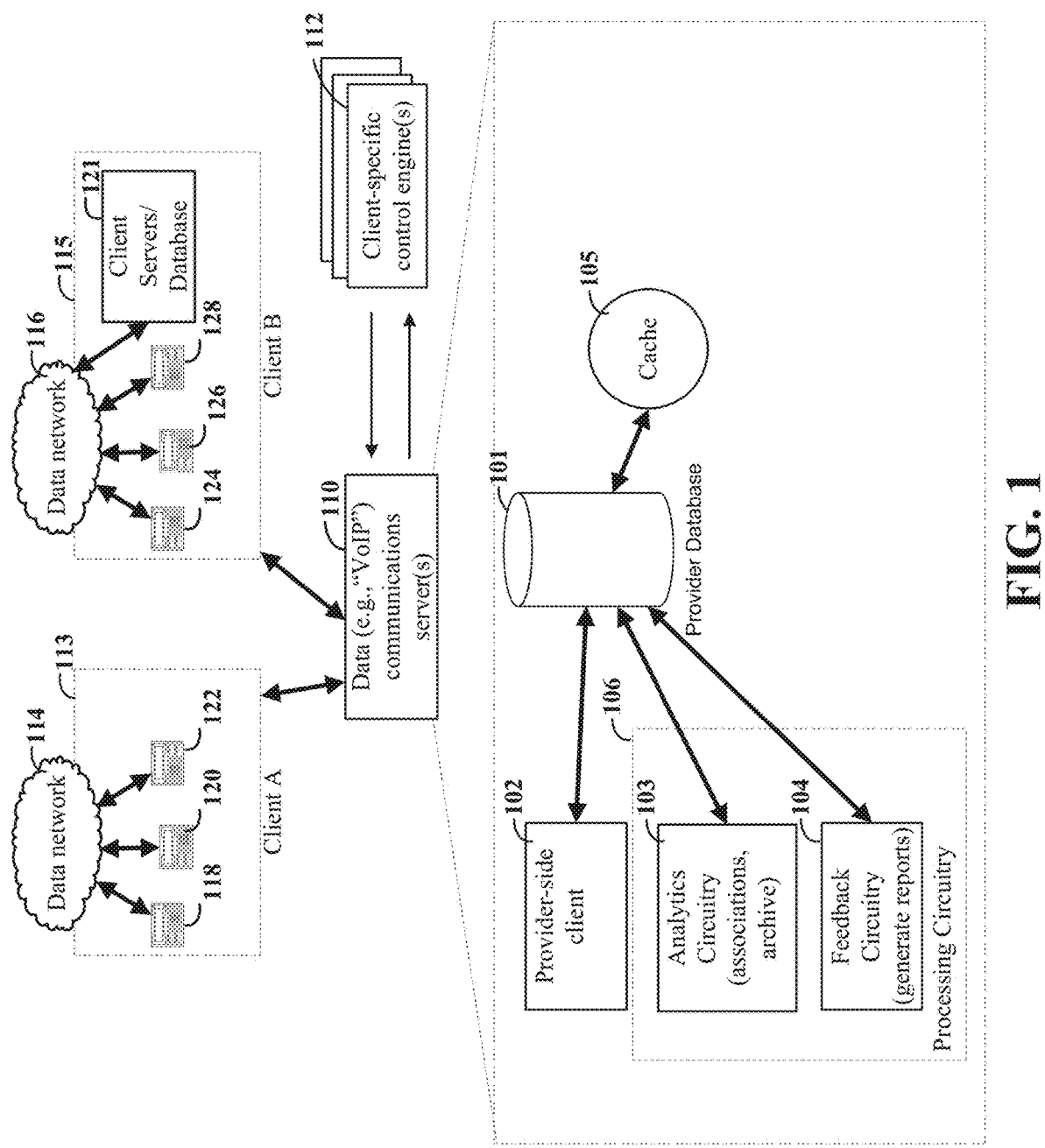
FIG. 1 illustrates an example data-communications system, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving analysis of customer-interaction metrics from digital voice data in a data-communications system. In certain implementations, aspects of the present disclosure have been shown to be beneficial when used in a Voice over Internet Protocol (VoIP) system including a VoIP communications server that interfaces with a plurality of remote-situation client entities. While the present disclosure is not necessarily limited to such VoIP communications systems as described herein, for purposes of facilitating understanding and appreciation of certain embodiments, the following discussion uses such VoIP-based services and systems in the context and on behalf of telecommunications platforms of client entities which subscribe to such services from a VoIP telecommunications service provider (with a server).

Users of a data-communications system can use a plurality of communication services to communicate with clients and other professionals and to carry out various tasks. For example, agents of a client entity can use a private network application to generate work products, a cloud-based application to manage service issues, another cloud-based application to manage direct communications such as email and chat messages, and yet another cloud-based application to manage financial matters such as billing and invoicing. In many instances, it can be beneficial for an entity subscribed to or that otherwise uses the data-communications system to analyze audio conversations across the entity (or across many entities) to improve subsequent interactions with the client or professional. For example, as a particular agent of an entity is conversing vocally with a client, the spoken conversation is captured and transcribed from audio to digital voice data (e.g., audio to data). In specific aspects, a data-communications server operated by the data-communications provider can capture and analyze conversations of many (e.g., 10,000 or more) agents, which can be stored in a directory. A client on the agent side can communicate with a web client, such as a Virtual Contact Center (VCC) web client, and a client on the provider side. In some embodiments, the client on the agent side can transcribe the conversation from audio to the digital voice data. In other embodiments, the client on the agent side can communicate the audio to a data-communications server operated by the entity, which transcribes the audio to digital voice data using processing circuitry in communication therewith. The processing circuitry can form part of the data-communications server or be separate therefrom. As used herein, the digital voice data is indicative of transcribed audio conversations between agents and others (e.g., customers or other external personal) of remotely-situated client entities.

In specific embodiments, the processing circuitry analyzes the received digital voice data, the digital voice data being from the data communication services provided by the data-communications server. The analysis can include identifying keywords and speech characteristic parameters from the digital voice data, which can be, alone or together, indicative of a tone or a sentiment of a conversation (e.g., is the conversation going well or not). Example speech characteristic parameters can include a frequency, wavelength or velocity, and/or amplitude of the audio. In some embodiments, the speech characteristic parameters can be compared to a baseline of the agent to determine a tone. In other embodiments and/or in addition, speech characteristic parameters of the customer can be compared to thresholds to determine a tone. In a number of embodiments, the threshold can be different for different geographic regions, different types of customers (e.g., age, sex), different industries, among other types of classifications. In addition, particular keywords can be associated with and/or indicate a greater probability of a particular tone, sentiment, and/or outcome. As a particular example, the phrases "I want to speak to a manager" or "What is your name" can be associated with a conversation that is not going well for the agent. In other instances, "What is your name" at a particular frequency can be indicative of a positive outcome (e.g., an agent resolves an issue and the customer would like to commend the agent). Although as may be appreciated by one of ordinary skill in the art, embodiments are not so limited and can include a variety of different associations. Further, in various embodiments, the same keywords or phrases can indicate different tones or outcomes for different types of customers.

The identified keywords and speech characteristics can be associated with outcomes of the transcribed audio conversation. The associations can be provided in an archive stored on a memory circuit and which can be updated over time. In various embodiments, the outcome can be determined based on the keywords and/or metadata in the digital voice data. For example, the processing circuitry can identify the keywords and compare them to previously-identified associations of keywords and outcomes. As a specific example, an entity can initially set-up an archive to include associated words and phrases that indicate a sale has occurred, a subscription is continued, a customer hangs up prior to a sale, etc. Alternatively and/or additionally, the archive can include thresholds for speech characteristics parameters that are indicative of different tones or sentiments. The thresholds can indicate or otherwise be associated with a positive conversation, a negative conversation, and changes in threshold indicating a change from a positive to negative or negative to positive conversation. Such thresholds can adjust over time based on feedback into the system and corrections by agents. For example, prior to storing an outcome as associated with a keyword and/or speech characteristics parameter, the outcome and the association can be provided to the agent and/or to a manager for review and approval. In response to an input verifying the outcome, the association is stored. In response to an input correcting the outcome, the associated is not store or a revised outcome is associated with the speech characteristics parameter and stored.

The analysis of the digital voice data can be used for training purposes. For example, a particular agent is provided feedback after the call on what keywords to avoid and/or strategies for the next call. More specifically, the feedback can include providing the association(s) to the client data-communications server and/or to the endpoint device of the agent. In a number of specific embodiments, the feedback or training can be provided in real time or near-real time during the audio conversation. For example, the agent, via an endpoint device (e.g., a computer or otherwise) can be provided a display or audio that cannot be heard by the customer, that indicates keywords to avoid, keywords to use, and/or directs the user to change their speech pattern (e.g., slow your speech down, take a deep breath). In some specific embodiments, specific keywords, alone or in combination with specific speech characteristic parameters, can cause an auto-trigger for connecting a manager to the audio conversation. For example, another endpoint device that is used by the manager can be bridged to the data communication, such as a VoIP call. The data-communications server can access a database to identify the manager and information for connecting the manager into the audio conversation. In this way, a manager can be bridged into a call without additional action by the agent. In some instances, different customers can have different keywords or speech characteristic parameters that trigger the connection with the manager. These keywords or speech characteristic parameters can be based on previous audio conversations with the customer, identification of a category of customer (e.g., important customer that is ranked 10 on a scale of 1-10), among other analytics.

In various embodiments, the processing circuitry and/or the data-communications server operated by the data-communications provider or a client side server can analyze the associations over a period of time, and generate a report indicating different outcomes and associated keywords and/or speech characteristics parameters. Such reports can be used for training purposes and can also be used to identify different patterns. For example, customers from different geographic regions can interact similarly or differently from one another. As previously described, specific keywords or tones can indicate different outcomes based on geographic regions, markets, type of customer, etc. The processing circuitry and/or data-communications server can provide assessment of a quality of calls based on the analysis, and provide feedback to the entity. The feedback can be used for training, which can be provided in real time during the call or after.

In some specific embodiments, the analytics can be provided as a service by the data-communication (e.g., VoIP) provider. For example, the analytics can identify keywords and/or tones/sentiments that result in positive outcomes, and also keywords that provide faster outcomes. Additionally, the metrics used to assess the outcome and/or the quality of the call can adjust over time. The adjustment can be responsive to additional digital voice data, and/or verification or adjustment by the agents or a manager to ensure the determined outcomes are correct. In a more specific example, the feedback can be provided by identifying customer-interaction metrics in the digital voice data. In some embodiments, the associations can be locked and a manager reviews the recommended adjustments (by the agent) and approves or denies the adjustment. The customer-interaction metrics include values or ratings of an interaction of an agent with a customer. For example, the customer-interaction metrics can include different ratings which can be impacted by the use or non-use of specific keywords, phrases and speech characteristic parameters.

The processing circuitry can analyze the data over time and across a plurality of agents. For example, particular agents can be identified for an entity that have customer-interaction metrics outside a threshold value. Such agents, for example, can be provided feedback, as described above, for training purposes. The feedback can include identification of customer-interaction metrics to adjust for potentially better outcomes or specific outcomes (e.g., a sale or customer retention). In some instances, the feedback is provided in real time and/or during the conversation, such as recommended phrases to the say to the customer and/or recommended adjustments in the agent's tone. The customer-interaction metrics can be tracked over time and/or adjusted using digital voice data of additional audio conversation.

In various embodiments, the assessment of call quality can be provided as a service to an entity. For example, a data-communications provider can provide the analytics as a service and/or package. The analysis can be based on geographic regions, markets, type of customers, among other types of categorizations as specified by the entity. The assessment can be used to generate reports on different agents, regions, and to use for training purposes. For example, feedback can be provided to agents to indicate specific phrases used that can have resulted in a particular outcome, suggested phrases to use, and which can be provided in real time and/or after the call.

Turning now to the figures, FIG. 1 illustrates an example of a data-communications system, consistent with embodiments of the present disclosure. As illustrated in FIG. 1, the data-communications system includes a data-communications server 110 configured to provide data communication services, including data communications such as VoIP calls, for a plurality of endpoint devices 118, 120, 122, 124, 126, 128 connected in one or more data networks 114, 116. In specific embodiments, the data-communications server 110 is a VoIP communications server that provides VoIP communications. Although FIG. 1 illustrates two data networks 114, 116 communicatively coupled to the data-communications server 110, examples are not so limited and the data-communications server 110 can be communicatively coupled to three or more data networks.

The endpoint devices are circuit-based instruments that are used by personnel (or users) and include data communications-enabled circuitry, such as VoIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data-communications server 110. Registered devices for each client account can be listed in a respective account settings file (not shown) stored by the data-communications server 110. In this example, endpoint devices 118, 120, and 122 are associated with an account 113 for a first client A and endpoint devices 124, 126, 128 are associated with an account 115 for a second client B. In such a manner, a plurality of endpoint devices can each be serviced by the data-communications server 110 in accordance with the present disclosure. One or more of the clients can have client servers and/or databases 121 used to implement a variety of different services.

The system can include one or more processing circuits configured to implement client-specific control engines 112, which are configured to adjust the data-communications provided for each client account according to a respective set of control directives. For instance, the client-specific control engines 112 can adjust routing of a data (e.g., VoIP) communication for a client account by generating client-specific sets of control data to the data-communications server 110.

Different embodiments can implement the client-specific control engines 112 in various locations. For example, client-specific control engines 112 for one or more client accounts can be implemented in a central server connected to, or incorporated with, the data-communications server(s) 110. Additionally or alternatively, one or more client-specific control engines 112 can be implemented by one or more processing circuits maintained by the client (e.g., server/database 101). Similarly, the control directives can be stored locally within the client-specific control engines, or stored remotely (e.g., in a centralized database, in a database maintained by the client or a combination thereof). In various embodiments, the data-communications system can track a variety of parameters and/or metrics related to calls made or received by the agents of a client entity via processing circuitry 106 that is communicatively coupled to the data-communications server 110. Although the processing circuitry 106 is illustrated as a component of the data-communications server 110, embodiments are not so limited and the processing circuitry can form part of or be separate from the data-communications server 110. The parameters can include information such as average call duration, compliance of call opening and account information, identification of issues and troubleshooting, resolution, professionalism, and other metrics. The parameters can be scored (e.g., percentage or other value scored) to rate the particular agent on each particular call and to form a metric used to assess an agent. In some embodiments, the parameters and/or metrics can be assessed automatically by the system using keywords. In other embodiments and/or in addition, the calls are recorded and can be replayed for a person to score (or update an automatic score) on the metrics. The parameters and/or metrics can be used to determine an outcome of the call. For example, the resolution can be indicative of the outcome. The scores can be reviewed upon recording the calls which can be reviewed by a reviewer. For example, the reviewer can listen to the call recording while a user interface is displayed on a computing device associated with the reviewer. The user interface displayed can illustrate a timeline of the recorded call, which can show timing of the current voice data being played. The timeline can allow the reviewer to navigate within the call by selecting portions of the timeline to change what the reviewer is listening to. Additionally, the agent and the customer can have different waveforms for efficient reviewing. In other embodiments, other types of analysis are used, as further described herein.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

The parameters and/or metrics can be tracked across a plurality of agents and over time. Such metrics can be used to generate reports on individual agents and/or comparing one or more agents. For example, the reports can be generated based on filters, such as agent's name, queue, length of call, customer name, transferred calls, transaction codes, custom fields, among other filters. The reports can be used to set performance baselines and measure changes over time. Additionally, in some embodiments, the parameters can be scored to form metrics or the metrics can be revised by reviewers manually and the scores can be normalized. For example, multiple reviewers can score the same call. Differences between the scores can be used to normalize the review scoring between the different reviewers. The reports can be periodically generated and stored. For example, the reports can be generated and scored weekly, monthly, quarterly, and/or yearly, and which can be indicative of customer feedback (provided without the user actively answering a questionnaire).

As previously described, client-specific control engines can be used to facilitate adjustment of a variety of remote services including, for example, data-communication services such as VoIP calls, audio and/or video conferencing, general private branch exchange services, packet switching, chat, and traffic management as well as non-VoIP services including, but not limited to, website hosting, remote data storage, remote computing services, and virtual computing environments. One or more of such services can be provided, for example, by a cloud computing network having one or more servers configurable for a plurality of clients.

The data-communications server 110 interfaces with the plurality of remotely-situated client entities to provide data communications services. As illustrated in the lower portion of FIG. 1, various example embodiments can include a data-communications server 110 having or otherwise being in communication with a plurality of modules and circuitry (e.g., sets of task-specific CPU instructions). Each client entity that is communicatively coupled to the data-communications server 110 can access data and/or services provided by the data-communications server 110. The system (via the data-communications server 110) can include a provider-side client module 102 and processing circuitry 106 that includes analytics circuitry 103 and feedback circuitry 104, among other components. In specific embodiments, data-communications server 110 can capture and analyze digital voice data from spoken conversations between agents of the client entity and customers. The spoken conversations can be transcribed from audio to digital voice data by the data-communications server 110, the endpoint device of the agent via a client on the endpoint device, and/or client data-communications server. The transcription of the spoken audio words to digital voice data can occur via a variety of methods.

As may be appreciated by one of ordinary skill in the art, audio can be transcribed to text using a variety of techniques. As an example, an audio file can be generated and provided to speech recognition circuitry, which can be part of the endpoint device, the data-communications server 110, or other external circuitry. The audio file, which includes an acoustic signal received by a microphone of the endpoint, is converted or transcribed to text (e.g., a set of text words) by the speech recognition circuitry. In various embodiments, the speech recognition circuitry can use a voice model and/or database of words for converting or transcribing the audio to text. For example, the speech recognition circuitry can index the words in the audio file to identify words or phrases, such as using an extensible markup langue (XML), structured query language (SGL), mySQL, idx, and other database language. For more general and specific teachings on transcribing audio to test, reference is made to U.S. Publication No. 2009/0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424,935, filed Jul. 31, 2000, entitled "Two-way Speech Recognition and Dialect System," each of which are fully incorporated by reference for their teachings.

As illustrated, the data-communications server 110 interfaces with a plurality of remotely-situated client entities and includes or is otherwise in communication with processing circuitry 106. The processing circuitry 106 can receive digital voice data indicative of transcribed audio conversations between a plurality of agents and customers of a remotely-situated client entity and identify keywords and speech characteristic parameters from the digital voice data. In specific embodiments, the data-communications server 110 captures the digital voice data via a client on the agent side communicating with a VCC web client and a client on the server side (e.g., the provider-side client 102) and provides the digital voice data to the processing circuitry 106. In other embodiments, the agent-side client communicates the digital voice data to the provider-side client 102. The provider-side client 102 then provides the digital voice data to the analytics circuitry 103 for identification of keywords and/or speech characteristic parameters. The identification can include analyzing the digital voice data for matches to keywords and speech characteristic parameters stored in an archive and/or database 101. The database 101 can include a relational database management system (RDMS) which stores data securely and returns the data in response to requests from other applications, as implemented by a database management server, and which can temporarily store data in cache 105.

The stored keywords and/or speech characteristic parameters can be associated with outcomes, in some embodiments. Example outcomes can include sale, no sale, positive or negative tone/sentiment. A tone or sentiment of the audio conversation can indicate how the call is perceived by the customer. A tone or sentiment can be identified based on the speech characteristic parameters. Example speech characteristic parameters include frequency, velocity, and amplitude of the conversation.

In a number of specific embodiments, the speech characteristic parameters can be compared to one or more thresholds. For example, the processing circuitry 106 via the analytics circuitry 103 and the provider database 101 can identify a speech characteristic parameter is outside of a threshold value (e.g., indicates problem), and which can be indicative of a tone of sentiment of the conversation. As a specific example, audio above a particular amplitude and velocity can be indicative of a customer or agent who is upset or otherwise agitated. The thresholds can include generic thresholds (anything above a particular value), thresholds that are specific to geographic regions or types of customers, and/or baseline values of the specific agent. For example, if the agent's speech is faster and louder than their baseline, it can be indicative of an issue in the conversation.

The processing circuitry 106 can provide association of the keywords and/or speech characteristic parameters with outcomes based on the analysis. The associations can be stored in the database 101 and/or provided to a client data-communications server 121 as feedback via the feedback circuitry 104. The feedback can be provided to a manager of the client entity and used for training purposes. Alternatively and/or in addition, the feedback can be provided to the particular agent in real time or near real time, such as while the audio conversation is ongoing. The feedback can include specific phrases to use and/or suggested changes in speech characteristic parameters.

In other embodiments, the feedback is provided to a manager, such as via a report that summarizes a subset of agents for the client entity. The report can include customer interaction feedback using the associations indicating negative and positive outcomes and associated keywords and/or speech characteristic parameters.

In some embodiments, the processing circuitry 106 can identify a speech characteristic parameter outside of a threshold value (i.e., indicates problem) or a keyword that is associated with a (manager) trigger, and in response, automatically bridge a manager of the respective agent into the audio conversation. The processing circuitry 106 and/or the data-communications server 110 can access a database to identify the manager and information for bridging the manager into the audio conversation.

In some examples, the processing circuitry 106 can store the associations in a database as an archive that is accessible and that ties the keywords with dates of the conversations and the speech characteristic parameters of the particular transcribed audio conversations. The archive can be adjusted over time based on additional audio conversations. For example, the processing circuitry 106 can adjust the associations over time based on further analysis of digital voice data and provide the adjustments as feedback. Alternatively and/or in addition, the adjustments can be based on user input, such as an input from an agent or a manager, as further described herein.

Figure 2:
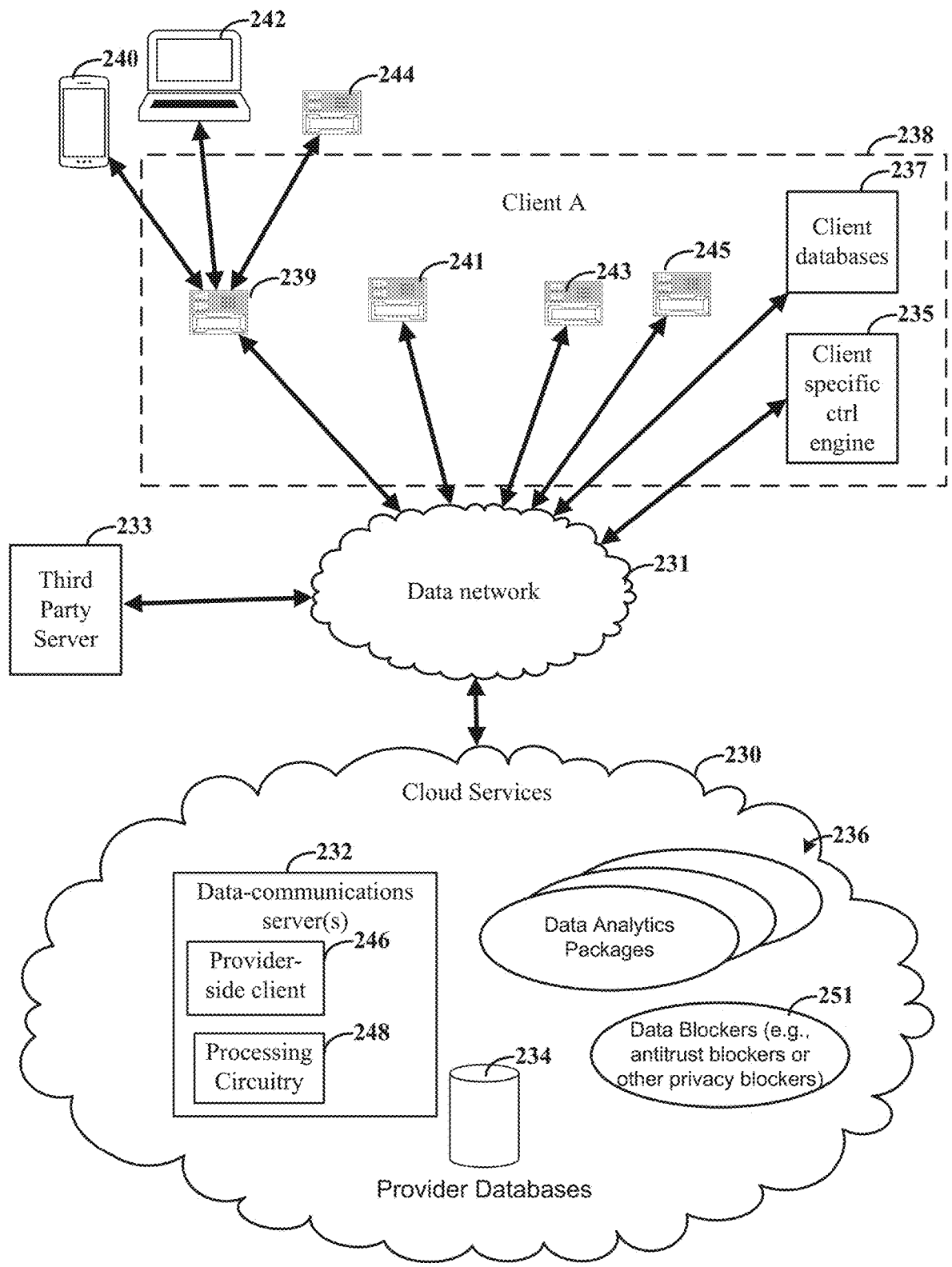
FIG. 2 illustrates an example data-communications system, consistent with embodiments of the present disclosure.

FIG. 2 illustrates an example data-communications system that analyzes digital voice data for tone or sentiment in accordance with various embodiments. In connection with the specifically-illustrated example, endpoint devices 239, 241, 243, 245 connected in a data network 231 are configured to place and receive VoIP telephone calls between other VoIP endpoint devices, and/or between non-VoIP endpoint devices, although embodiments are not limited to VoIP communications systems. Non-VoIP endpoint devices can include, for example, plain old telephone service (POTS) telephones and cellular-capable devices, which might also be VoIP capable (e.g., smart phones with appropriate VoIP software applications). The various endpoint devices 239, 241, 243, 245 are associated with an account 238 of a client, e.g., Client A, and include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VoIP endpoint devices 239, 241, 243, 245 can include, but are not limited to, desktop computers, mobile (smart) phones, laptop computers, and tablets, such as illustrated by 240, 242, 244. When each of the endpoint devices originates or receives a call in a telephone network, each can be characterized or referred to as an addressable call endpoint or a dial peer. The client can have or be associated with one or more client databases 237 for storing various data and a client specific control engine 235.

The call routing and other services for the VoIP telephone calls can be provided by one or more data-communications servers 232 within a cloud services system 230 (e.g., configured to provide a PaaS to customers of the VoIP provider). In particular example embodiments, the data-communications servers 232 can be located within platform as a service (PaaS) computing servers, which are part of the cloud services system 230. The cloud services system 230 also includes one or more provider hosted client-specific control engines 235. A client-specific control engine can also be implemented locally by a client (e.g., 246). In some embodiments, data centers can be part of a cloud-based system where the hardware providing the cloud services is located in a number of different data centers with different physical locations. Consistent with embodiments, the cloud services can include session initiation protocol (SIP) servers, media servers, and servers providing other services to both VoIP endpoint devices and the users of the VoIP endpoint devices. In some instances, the various servers, including both the data-communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data-communications server which uses Session Initiation Protocol (SIP) to handle various call functions (e.g., call setup and tear down); however, the various embodiments discussed herein are not necessarily limited thereto. Consistent with the above and other embodiments disclosed herein, the data-communication servers are VoIP communications servers that are configured to establish a leg of the call from the VoIP endpoint devices (or dial peers) to another VoIP endpoint device, or to a gateway.

According to various embodiments, one or more data-communications servers 232 can monitor and analyze call data relating to digital call data of calls occurring using the VoIP endpoint devices 239, 241, 243, 245 via processing circuitry 248. For example, a data-communications server can be designed to receive digital voice data, such as directly from an agent-side client associated with particular endpoint devices. The agent-side client can communicate the audio or the digital voice data to the provider-side client. The provider-side client then provides the audio or digital voice data to processing circuitry (e.g., processing circuitry 248, although embodiments are not so limited and can include processing circuitry external to the data-communications server) for further analysis, such as transcribing to digital voice data, identifying keywords and/or speech characteristic parameters, identifying an outcome, and providing an association between the keywords and/or speech characteristic parameter using the identified outcome. The association can be stored in an archive in a provider-side database 234. In some specific embodiments, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server to provide a new association and/or update an existing association. The script can use the information to generate a report that can be used for training, promotions, and/or other analysis of agents. According to various embodiments, the database queries can be sent to a client database 237. The feedback can be provided in real time or near real time to the endpoint device of the agent and/or can be accessed by a manager.

Consistent with certain embodiments, the data-communications server 232 can be configured to interface with a third party server 233 such as a customer server, or other third party servers. For instance, a CPXML document stored by the data network 231 can identify, based upon a received call, a Uniform Resource Identifier (URI) that points to customer servers, or to other third party servers.

The above described data-communications system, as illustrated by FIG. 1, and/or FIG. 2 can be used to capture and analyze digital voice data across a plurality of entities and provide feedback to an entity. More specifically, the feedback can include customer interaction feedback including analysis of quality of agent interactions with customers and recommendation for improving the same.

The feedback, in various embodiments, can include or be based on an assessment of a quality of agent interactions with customers, which is interchangeable referred to as "customer-interaction feedback" herein. The digital voice data, as well as the keywords and speech characteristic parameters, can be used to analyze and assess agents. The feedback can be provided in real time, such as during a VoIP call between the agent and a customer. For example, an agent can be provided guidance during a live call in order to change an outcome of the call. In other instances and/or in addition, the feedback can be used to provide an assessment of the quality of the call, which can be used for training purposes by a manager.

In some instances, the feedback and/or assessment may be different for different geographic regions and/or types of customers. For example, as further describe herein, customers from the Southern region of the United States may respond better to different speech characteristics than customers from the Northeastern region of the United States. Such associations may be determined over time using the database that captures the digital voice data, and may be across different entities. The analytics may indicate that certain tones reflect an upset or happy customer, particular phrases or words that result in positive or negative outcomes for different types of customers, among other analytics. The feedback, in various embodiments, is provided as a report and/or is provided in real time to the agent, such as suggested phrases or changes in tone that may result in a particular outcome, such as a positive (or faster) outcome or a greater probability of positive outcome. The feedback can be displayed on a user device that the agent has access to (e.g., GUI of a computer) and/or as voice that the agent can hear but the customer cannot hear. In such embodiments, the agent can determine whether or not to follow the feedback, and which can be used to further adjust the associations. For example, if a user does not follow the feedback and has a positive outcome, additional keywords or speech characteristics parameters can be identified from the conversation and associated with the positive outcome. Additionally and/or alternatively, data in the feedback can have an adjusted (e.g., lowered probability) association with the outcome, although embodiments are not so limited.

The one or more data-communications servers 232 monitor and analyze call data relating to digital call data of calls occurring using the VoIP endpoint devices 239, 241, 243, 245 can further analyze such assessment for different customers over many entities via the processing circuitry 248 (which can form part of the data-communications server 232 or be separate therefrom) and can provide the same as data analytic packages 236. The packages 236 can be provided as a service to entities and can be based on geographic regions, markets, and type of customers. In specific embodiments, the packages 236 can be provided as a service and can be used for training agents for providing better customer interactions, such as suggested phrasing and words that result in particular outcomes and/or outcomes that are efficient. The packages 236 can be based on various customer-interaction metrics used to analyze the quality of calls.

In some embodiments, the metrics or criteria can be adjusted over time. Example customer-indication metrics include a number of outcomes identified as positive, use of particular keywords, audio outside a threshold frequency/velocity (may be based on agent's baseline). As described above, the adjustment can be based on artificial intelligence used to analyze digital voice data across a plurality of entities over time. Such analysis may identify patterns between types of customers and outcomes, such as particular tones, frequencies, phrase, etc., that result in particular outcomes and/or at a greater frequency. A particular agent, such as a manager, can verify the adjustments to ensure the outcome determined via the analysis by the processing circuitry 248 is correct. In some specific aspects, the associations can be locked and a manager reviews the recommended adjustments (by the agent) and approves or denies the adjustment.

As an example, the data analytics packages 236 can be offered as a cloud-based service to an entity to use for training purposes and/or otherwise improve or monitor customer interactions by agents. In some embodiments, the cloud-based services can include automatic antitrust blockers. For example, the data-communications service provider can have data blockers 251 which can automatically block particular data provided as part of the data analytics packages 236 to particular entities based on antitrust concerns or privacy for other entities. Example feedback can include outputting a phrase to say during a live audio conversation to an endpoint device currently in use by the agent for the live audio conversation between the agent and the customer, outputting the phrase provided as data for display on user display of the endpoint device and/or audio provided to a speaker of the endpoint device, a customer feedback report using the associations indicative negative and positive outcomes and associated keywords and/or speech characteristic parameters associations.

The metrics and associations can be analyzed over time and used to adjust the archive by adjusting keywords and speech characteristic parameters associated with outcomes for a geographic location of the customer or the agent of the current audio conversation (adjust tones/phrases that result in positive/negative for the specific geographic location), outcomes for different categorization of the customer or market associated with the customer of the current conversation (adjust tones/phrases that result in positive/negative for the type of customer). Additionally, the feedback can be used to promote agents, such as indicating agents having customer-interaction metrics above a threshold to the client data-communications server (identify agents with good outcomes for promotion).

In accordance with various embodiments, the system can be used to implement a method, including accessing, via processing circuitry and from a data-communications server that interfaces with a plurality of remotely situated client entities to provide data-communications services, digital voice data indicative of transcribed audio conversations between a plurality of agents and customers of a remotely-situated client entity and from the provided data-communications services. The digital voice data can include keywords and speech characteristic parameters associated with outcomes of the transcribed audio conversations. The method can further include analyzing, via the processing circuitry, the digital voice data to identify customer-interaction metrics including values of specific keywords and speech characteristic parameters of the digital voice data associated with particular outcomes, and provide identification of particular agents of the at least one remotely-situated client entity that have customer-interaction metrics outside a threshold value to client data-communications servers associated the particular agents (e.g., good or bad agents). Additionally, the customer-interaction metrics can be adjusted. For example, the adjustment can be based on digital voice data of additional audio conversations and/or corrections by the agent and/or a manager of the agent. In some specific embodiments, the adjustment is verified in response to receiving an input indicating approval, such as allowing for a manager to approve or further adjust based on real-life experience. Additionally, the adjustments over time may be based on different categories of customers, such as geography, sex, time of day, market, and age of the customer.

Feedback, as previously described, can be provided to the agent. For example, feedback to an agent of the plurality of agents can be provided during a live audio conversation based on the adjusted customer-interaction metrics, such as outputting a phrase to say during the live audio conversation to an endpoint device currently in use by the agent for the current audio conversation between the agent and the customer. In other embodiments, the analytics can be provided as the service or package as service to a third party.

Figure 3:
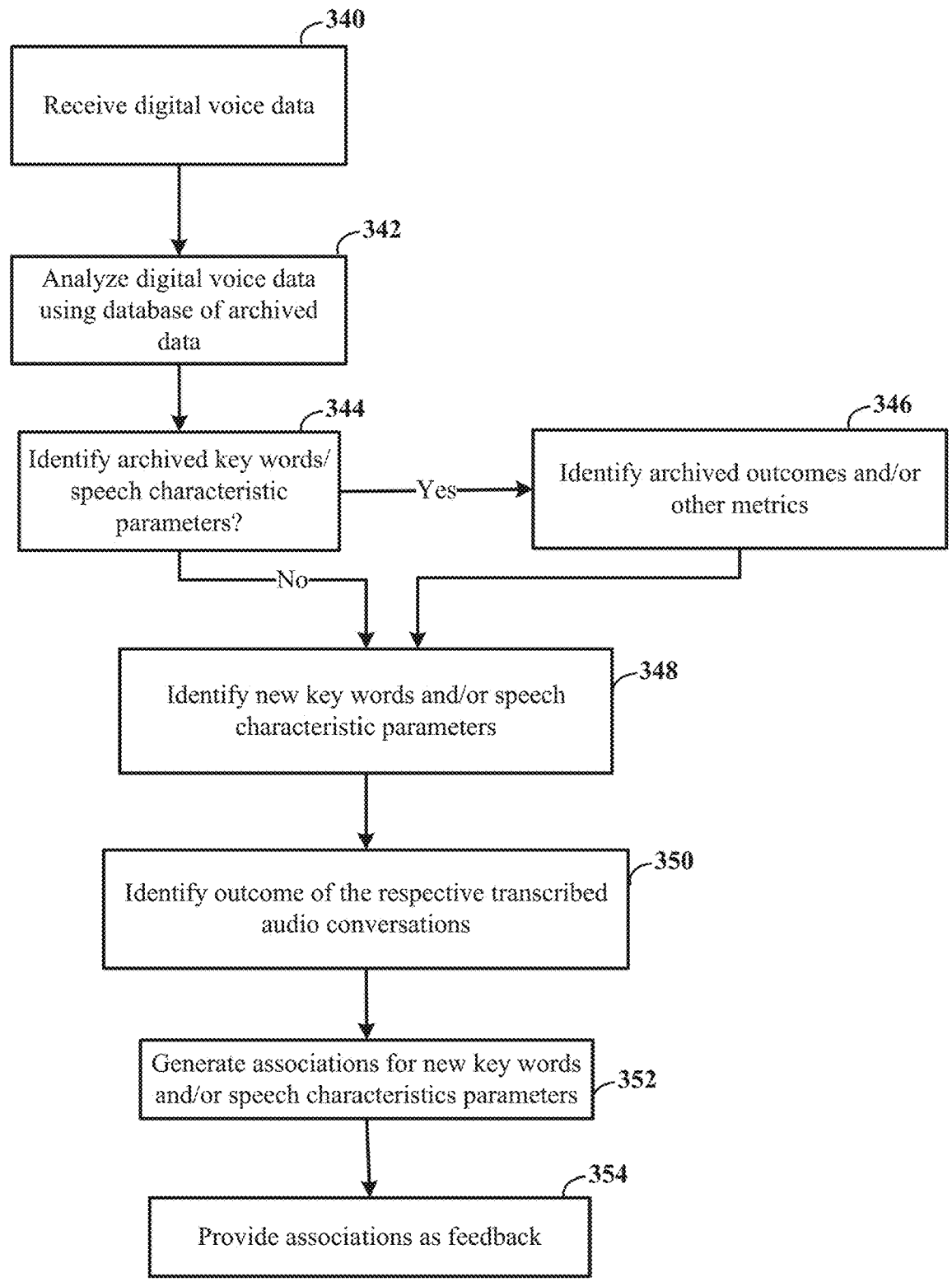
FIG. 3 illustrates an example method for use in a data-communications system, consistent with embodiments of the present disclosure.

FIG. 3 illustrates an example method for use in a data-communications apparatus, in accordance with various embodiments. The method can be used for analyzing digital voice data and providing feedback as a service.

At 340, the method includes receiving, at processing circuitry in communication with a data-communications server, digital voice data indicative of transcribed audio conversations between a plurality of agents and customers of a remotely-situated client entity. The digital voice data can be transcribed from audio by the endpoint device of the agents and communicated to the processing circuitry and/or the data-communications server via clients on the agent and provide side. In other embodiments, a client server can transcribe the digital voice data and communicate the same to the data-communications server and/or the data-communications server can transcribe communicated audio waves.

At 342, the digital voice data can be analyzed, via the processing circuitry, using a database, such as a database of archived data including associations of keywords and/or speech characteristic parameters and outcomes. The digital voice data can be analyzed to identify keywords and speech characteristic parameters of the digital voice data, identify outcomes of the respective transcribed audio conversations, generate associations with at least one of the keywords and speech characteristic parameters with the identified outcomes, and/or providing the associations to a client data-communications server as feedback on audio conversations with the customers.

For example, at 344, the digital voice data is analyzed and used to identify keywords and speech characteristic parameters of the digital voice data and compare the identified keywords and parameters to a database. The database has stored correlations or associations of keywords and parameters to tones or sentiments of a conversation and outcomes of the conversations. The associations or correlations can include a probability of the match indicating the outcome. In response to a match, at 346, the correlated archived outcomes is identified. In response to no match and/or in addition (can have matching and nonmatching keywords), at 348, new keywords can be identified. At 350, the outcome of the respective transcribed audio conversation can be identified. The outcome can be identified based on a match and a respective correlation and/or based on analysis of metadata in the digital voice data. In some embodiments, an agent can enter metadata that is correlated with the digital voice data and/or that otherwise ties to the transcript. The metadata can identify the outcome.

The use of the archived database, in various embodiments, can include performing artificial intelligence to determine the outcome. The processing circuitry and/or data-communications server can analyze patterns to identify and associate different keywords, phrases, and/or speech characteristic parameters with particular outcomes, and which can be different for different types of customers (e.g., different geographic regions, fields, sexes, ages, and other categorizations). The processing circuitry and/or data-communications server can analyze resulting data to determine the outcome, such as identifying a sale, retention of a customer, hang-up, loss of a customer, resolution of a problem, which can include a specific and identified problem or a general problem, among other outcomes. Overtime, the processing circuitry and/or data-communications server can update the database based on additional digital voice data. For example, at 352, the method includes generating associations with at least one of the keywords and speech characteristic parameters with the identified outcomes. The associations can include new keywords that are associated with particular outcomes, new outcomes, and increasing or decreasing a correlation of keywords or parameters with an outcome. For more general information on artificial intelligence and specific information on achieving artificial intelligence, reference to made to U.S. Publication No. 2004/0143559, filed on Jan. 13, 2004, entitled "System and Method for Developing Artificial Intelligence," and U.S. Pat. No. 5,473,732 filed on Feb. 7, 1995, entitled "Relational Artificial Intelligence System," each of which are fully incorporated herein for their teachings.

In specific embodiments, the associations can be classified differently for different types of customers. For example, the processing circuitry can provide different associations based on characteristics of the particular audio conversations, including characteristics selected from the group consisting of: geographic region of the customer, sex of the customer, age of the customer, type of customer, and a combination thereof. The associations are stored in the provider database as an archive that is accessible and that ties the keywords with dates of the conversations and the classifications, and which identifies keywords and phrases to avoid for particular types of customers and keywords and phrases to use for the particular types of customers.

As a specific example, and not intended to be limiting, a first region can include a Northeastern region of the United States and a second region can include a Southern region of the United states. It may be identified that customers from the first region speak at a greater frequency and amplitude that customers from the second region. As another example, it may be identified that women speak at a lower amplitude than men. A third region can include Southern Pacific Coast of the United States (e.g., parts of California) which may include customers that speak at a similar frequency and amplitude as customers from the first region. However, embodiments are not so limited and the above is provided only as an illustrative example. Additionally each of the above may have specific words and phrases to avoid, as they have a greater probability than other words at causing a positive or negative outcome. As a specific example, the second region may have a positive outcome associated with calling the customer "Miss" or "Mr.", whereas customers from the third region may have negative outcome associated with the same or may have a greater probability of a positive outcome when addressing customers by their first name.

In various embodiments, feedback can be provided. For example, at 354, the method further includes providing the associations to a client VoIP communications server as feedback on audio conversations with the customers. The feedback can be provided to the agent in real time and used by the agent to assist in achieving a positive outcome or to otherwise adjust an outcome of the conversation. In other embodiments, the feedback can be provided after the call is finished and used to train the user. For example, the feedback can be used to train the user in how to handle different situations. In some instances, a report is generated that can be reviewed by a manager, as previous described. Further, in specific embodiments, a manager can be automatically bridged into VoIP call responsive to particular keywords (e.g., swearing), based on the specific customer, and/or speech characteristics parameters outside a threshold. In such a manner, the feedback can include or be otherwise be indicative of customer feedback which is provided to the client entity without actively querying the customer, such as with the customer actively providing answers to a questionnaire.

In a number of related embodiments, the associations between keywords and/or speech characteristic parameters can be adjusted over time. The adjustment can be responsive to different outcomes or input from the agent or other users. For example, the processing circuitry can provide a respective association with at least one of the keywords and speech characteristics with the identified outcome to an agent associated with the audio conversation or a manager associated with the agent. In a number of embodiments, the associations can be locked and a manager reviews the recommended adjustments (by the agent) and approves or denies the adjustment. In response to the agent or manager providing an input indicating the associated is incorrect, the association is adjusted. In other embodiments and/or in addition, the association can be stored in response to the agent or manager providing an indication indicating the associated is correct or not providing any indication within a threshold period of time.

Figure 4:
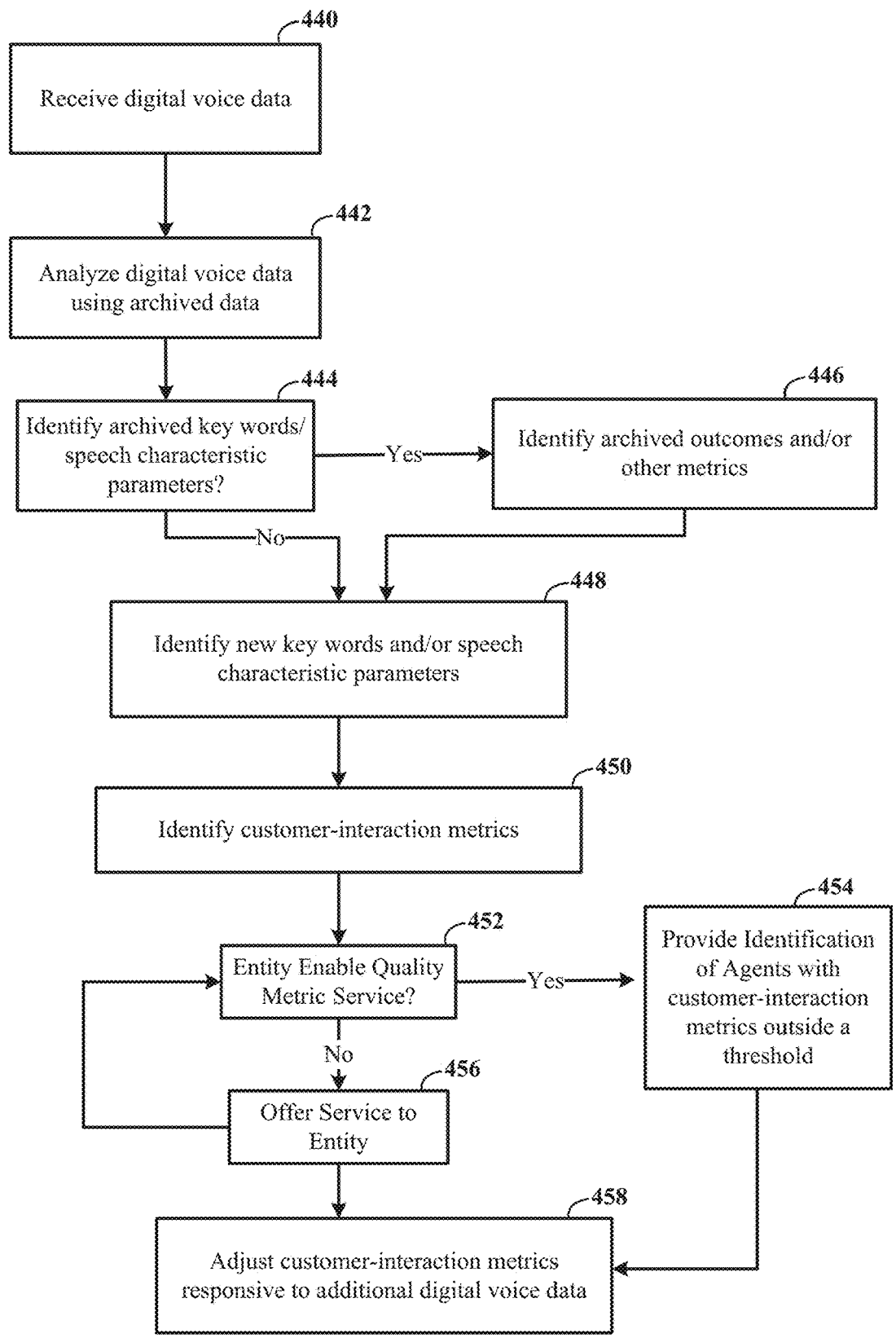
FIG. 4 illustrates an example method for use in a data-communications system, consistent with embodiments of the present disclosure.

FIG. 4 illustrates an example method for use in a data-communications system, in accordance with various embodiments. The method can be used to analyze customer interactions and provide feedback as a service.

The method at 440 can include receiving, at processing circuitry in communication with a data-communications server, digital voice data indicative of transcribed audio conversations between a plurality of agents and customers of a remotely-situated client entity. The digital voice data can be transcribed from audio by the endpoint device of the agents and communicated to the data-communications server via clients on the agent and provider side. The data-communications server can communicate the digital voice data to the processing circuitry and/or the processing circuitry can otherwise form part of the data-communications server. In other embodiments, a client data-communications or other type of server can transcribe the digital voice data and communicate the same to the data-communications server and/or the data-communications server can transcribe communicated audio waves.

At 442, the digital voice data can be analyzed, via the processing circuitry using a database, such as a database of archived data including associations of keywords and/or speech characteristic parameters and outcomes. The digital voice data can be analyzed to identify keywords and speech characteristic parameters of the digital voice data, identify outcomes of the respective transcribed audio conversations, generate associations with at least one of the keywords and speech characteristic parameters with the identified outcomes, and/or providing the associations to a client data-communications server as feedback on audio conversations with the customers.

For example, at 444, the identified keywords and speech characteristic parameters of the digital voice data can be compared to a database. The database has stored correlations or associations of keywords and parameters to tones or sentiment of a conversation and outcomes of the conversations. The associations or correlations can include a probability of the match indicating the outcome. In response to a match, at 446, the correlated archived outcome(s) is identified. In response to no match and/or in addition (can have matching and nonmatching keywords), at 448, new keywords can be identified. The outcome can be identified based on a match and a respective correlation and/or based on analysis of metadata in the digital voice data. In some embodiments, an agent can enter metadata that is correlated with the digital voice data and/or that otherwise ties to the transcript. The metadata may identify the outcome.

The use of the archived database, in various embodiments, can include performing artificial intelligence to determine the outcome, as previously described. Over time, the processing circuitry can update the database based on additional digital voice data. The method can include generating associations with at least one of the keywords and speech characteristic parameters with the identified outcomes. The associations can include new keywords that are associated with particular outcomes, new outcomes, and increasing or decreasing a correlation of keywords or parameters with an outcome.

In specific embodiments, the associations can be classified differently for different types of customers. For example, the processing circuitry can provide different associations based on characteristics of the particular audio conversations, including characteristics selected from the group consisting of: geographic region of the customer, sex of the customer, age of the customer, type of customer, and a combination thereof. The associations are stored in the provider database as an archive that is accessible and that ties the keywords with dates of the conversations and the classifications, and which identifies keywords and phrases to avoid for particular types of customers and keywords and phrases to use for the particular types of customers.

At 450, customer-interaction metrics can be identified. The customer-interaction metrics can include values, such as probabilities or scores, of specific keywords and speech characteristic parameters of the digital voice data as associated with particular outcomes. In some instances, different types of customers and/or different geographic regions can have different customer interaction parameters.

The feedback on customer interactions can be provided as a service. For example, at 452, a determination can be made on whether or not the entity associated with a particular agent has enabled a quality metric service. If not, at 456, the service can be offered to the entity. If the service has been enabled, at 454, the method can include providing identification of particular agents for particular remotely-situated client entities that have customer-interaction metrics outside a threshold value to client data-communications servers associated the particular agents (e.g., good or bad agents).

In specific embodiments, the feedback can be provided to a particular agent of a plurality of agents of the entity. The feedback can be provided during a live audio conversation based on the adjusted customer-interaction metrics, including outputting a phrase to say during the live audio conversation to an endpoint device currently in use by the agent for the current audio conversation between the agent and the customer.

Additionally, different customer-interaction metrics can be used to assess the quality of the agent's interaction based on characteristics of the particular audio conversation, including characteristics selected from the group consisting of: geographic region of the customer, sex of the customer, age of the customer, type of customer, and a combination thereof. The assessment can include a score or rating, as further described herein, and/or can be used for promotional purposes.

The additional data voice data of additional audio conversations, at 458, can be used to adjust the customer-interaction metrics using digital voice data of additional audio conversations. The adjustment is based on different customer-interaction metrics for different categories of customers including geography, sex, time of day, market, and age of the customer. Additionally, the adjustment may include an adjusted probability of the customer-interaction metric (e.g., phrases/keywords, tones, etc.) resulting in a particular outcome.

The adjustment can be verified prior to adjusting a data analytics package for a particular entity. For example, the adjusted customer-interaction metrics can be provided to the respective client servers by the processing circuitry and/or the data-communications server, and the adjustment can be adjusted in response to receiving an input indicating approval, such as allowing a manager to approve or further adjust based on real-life experience.

Alternatively and/or in addition, the data analytics packages can be provided as a service to a third party. More specifically, a third party can be provided analytics of the customer-interaction metrics for a particular market as a service. As previously described, portions of the analytics can be blocked based on previous analytics provided as a service to another third party of the same particular market (e.g., antitrust blocker).

In some specific embodiments, a respective association with at least one of the keywords and speech characteristics with the identified outcome is provided to an agent associated with the audio conversation. The agent can verify that the associated is correct. For example, in response to the agent providing an input indicating the associated is incorrect, the association is adjusted, or in response to the agent providing an indication indicating the associated in correct or not providing any indication, the associated is stored in the database. In some embodiments, the associations can be locked and a manager reviews the recommended adjustments (by the agent) and approves or denies the adjustment.

Various embodiments are implemented in accordance with the underlying Provisional Application (Ser. No. 62/650,652), entitled "Analysis of Digital Voice Data in a Data-Communication Server System," filed Mar. 30, 2018, to which benefit is claimed and which are fully incorporated herein by reference. For instance, embodiments herein and/or in the provisional application may be combined in varying degrees (including wholly). Reference may also be made to the teachings and underlying references provided in the underlying provisional application. Embodiments discussed in the underlying provisional are not intended, in any way, to be limiting to the overall technical disclosure, or to any part of the claimed invention unless specifically noted.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (VoIP) endpoint device (or endpoint) includes a communication circuit and (computer) processing circuits which are configured to establish (VoIP) communication sessions with other endpoint devices. The communications circuit can be enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, a processing circuit or circuitry, as provided above, is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A method for use in a data-communication system, the method comprising:
    using a unified data-communications server, having servers and processing circuitry located in a plurality of different locations, to
        provide data communications services including processing inbound data communications, and
        securely store in a database digital voice data derived from previous ones of the inbound data communications involving a plurality of agents and customers of different ones of remotely-situated client entities, wherein the digital voice data includes keywords and speech characteristic parameters associated with outcomes of previously-transcribed audio conversations of the different ones of remotely-situated client entities; and
    accessing and analyzing, via processing circuitry in communication with the unified data-communications server, the digital voice data as securely stored in the database;
    using the processing circuitry, configured with a data analytics package, for at least one current inbound data communication in real time or near-real time while an agent of the plurality of agents is engaged in the at least one current inbound data communication, to:
        identify customer-interaction metrics from the digital voice data, the customer-interaction metrics accounting for a geographic location corresponding to a participant of at least one current inbound data communication and including values in a form of probabilities or scores of specific keywords and speech characteristic parameters of the digital voice data and analyzing the customer-interaction metrics including the values in the form of probabilities or scores for conversion to a particular predictable one of the outcomes corresponding to the at least one current inbound data communication, based on the customer-interaction metrics, as being a positive or negative outcome,
        provide identification of one or more particular agents for particular remotely-situated client entities that have customer-interaction metrics outside a threshold value, the identification being provided from the data-communications server to a client data-communications server associated with the one or more particular agents, wherein the identified one or more particular agents is indicated as being associated with a set of one or more previous outcomes being positive or being negative, wherein the threshold value is selected from a plurality of thresholds, and the thresholds are different for at least one of different geographic regions, different types of customers, and different industries, and
        provide feedback to a manager of an agent associated with the at least one current inbound data communication regarding the particular predictable one of the outcomes, notify the manager of the particular predictable one of the outcomes, and implement client-specific control engines, by one or more processing circuits, to adjust routing of a VoIP communication for a customer account having customer-interaction metric outside the threshold value by generating client-specific sets of control data to the unified data-communications server; and
    adjusting, in response to said use of the processing circuitry, the customer-interaction metrics for altering quality of interactions of further ones of the inbound data communications, and therein enabling the processing circuitry to use the data analytics package to have more data for predicting outcomes of further ones of the inbound data communications.

2. The method of claim 1, wherein the adjustment is based on different customer-interaction metrics for different categories of customers including categories pertaining to multiple ones of geography, sex, time of day, market, and age of the customer, and wherein the method further includes the data-communications server blocking, based on the data raising antitrust or privacy concerns of a third party and on an analytics service provided to the third party, portions of analytics data in the data analytics package from being conveyed as part of the interactions of the at least one current inbound data communication.

3. The method of claim 1, further including the data-communications server:
    providing the adjusted customer-interaction metrics to the client data-communications server by the data-communications server, and
    verifying the adjustment in response to receiving an input indicating approval.

4. The method of claim 1, further including the data-communications server:
    providing feedback to the agent during a current audio conversation based on the adjusted customer-interaction metrics, the feedback including outputting a phrase to say during the current audio conversation to an endpoint device currently in use by the agent for the current audio conversation between the agent and the customer.

5. The method of claim 1, further including the data-communications server:
providing different customer-interaction metrics based on characteristics of a particular audio conversation, the feedback including characteristics selected from the group consisting of: geographic region of the customer, sex of the customer, age of the customer, type of customer, and a combination thereof.

6. The method of claim 1, further including the data-communications server providing analytics of the customer-interaction metrics for a particular market as a service to a third party.

7. The method of claim 1, further including the data-communications server blocking portions of analytics based on previous analytics, and on antitrust or privacy concerns, as a service to another third party that is in a particular market common with activities of the identified one or more particular agents.

8. The method of claim 1, further including the data-communications server providing a respective association with at least one of the keywords and speech characteristics with an identified outcome to the agent in real time or near-real time while the agent is engaged in the at least one current inbound data communication.

9. The method of claim 1, further including the processing circuitry accessing a database to identify a manager and contact information for bridging the manager into a current one of the inbound data communications, and based on the contact information, bridging without action by the agent from among a plurality of agents, the manager of the respective agent into the current one of the inbound data communications.

10. The method of claim 9, wherein the current one of the inbound data communications involves an audio conversation.

11. The method of claim 1, wherein
the data communications services include a data-analytics service, provided by the unified data-communication server remote to the client data-communications server associated with the one or more particular agents, to analyze the inbound data communications and to block particular data which is indicated by a set of data associated with the data-analytics service and related to antitrust or privacy concerns for at least one of the remotely-situated client entities.

12. An apparatus, comprising:
a unified data-communication server, having servers and processing circuitry located in a plurality of different locations, to
provide data communications services to different remotely-situated client entities,
process inbound data communications which are received by the data-communications server and which involve respective ones of the different remotely-situated client entities, and
securely store in a memory circuit digital voice data derived from previous ones of the inbound data communications involving a plurality of agents and customers of different ones of remotely-situated client entities, wherein the digital voice data includes keywords and speech characteristic parameters associated with outcomes of previously-transcribed audio conversations of the different ones of the remotely-situated client entities; and processing circuitry, coupled to the memory circuit and configured with a data analytics package, for at least one current inbound data communication in real time or near-real while an agent from among a plurality of agents is engaged in the at least one current inbound data communication, to:
access and analyze the digital voice data as securely stored in the memory circuit,
identify customer-interaction metrics by using the digital voice data, the customer-interaction metrics accounting for a geographic location corresponding to a participant of at least one current inbound data communication and including values in a form of probabilities or scores of specific keywords and speech characteristic parameters of the digital voice data and analyzing the customer-interaction metrics including the values in the form of probabilities or scores for conversion to a particular predictable one of the outcomes corresponding to the at least one current inbound data communication, based on the customer-interaction metrics, as being a positive or negative outcome, for particular remotely-situated client entities that have customer-interaction metrics outside a threshold value, provide identification of one or more particular agents from the data-communications server to one or more client data-communications servers associated with the particular agents, wherein the threshold value is selected from a plurality of thresholds, and the thresholds are different for at least one of different geographic regions, different types of customers, and different industries, and
provide feedback to a manager associated with the plurality of agents during a current audio conversation based on the identified customer-interaction metrics being outside the threshold value, notify the manager of the particular predictable one of the outcomes, alter a quality of interactions of the inbound data communications by the particular agents as a function of the customer-interaction metrics and implement client-specific control engines, by one or more processing circuits, to adjust routing of a VoIP communication for a customer account having customer-interaction metric outside the threshold value by generating client-specific sets of control data to the unified data-communications server.

13. The apparatus of claim 12, wherein the feedback, as provided by the processing circuitry, includes outputting a phrase to say during the current audio conversation to an endpoint device currently in use by the agent for the current audio conversation between the agent and the customer as vocals or data on a screen for the agent.

14. The apparatus of claim 12, wherein the processing circuitry is further configured to adjust the customer-interaction metrics based on additional outcomes of previously-transcribed audio conversations of the different ones of the remotely-situated client entities.

15. The apparatus of claim 12, wherein the processing circuitry is further configured to identify the keywords and speech characteristic parameters from the digital voice data, and wherein the speech characteristic parameters are indicative of a tone or sentiment of the previously-transcribed audio conversations, and are selected from the group consisting of: frequency of audio of the previously-transcribed audio conversation, wavelength or velocity of the audio, amplitude of the audio, and a combination thereof.

16. The apparatus of claim 12, wherein the processing circuitry is configured to provide different customer-interaction metrics based on characteristics of a particular audio conversation, including characteristics selected from the group consisting of: geographic region of the customer, sex of the customer, age of the customer, type of customer, and a combination thereof.

17. The apparatus of claim 12, wherein the processing circuitry and the data-communications server are further configured to provide the feedback to at least one of the particular agents of the plurality of agents in real time and during the current audio conversation.

18. The apparatus of claim 12, wherein the processing circuitry is to access a database, in response to the identified customer-interaction metrics, to identify a manager and information for bridging the manager into a certain audio conversation associated with an inbound one of the data communications, and bridging, without action by the agent from among a plurality of agents, the manager of the respective agent into the current audio conversation.

19. The apparatus of claim 12, wherein the data communications services include a data-analytics service, provided by the unified data-communication server remote to the one or more client data-communications servers associated with the one or more particular agents, to analyze the inbound data communications, and to block particular data as indicated by a set of data associated with the data-analytics service for at least one of the remotely-situated client entities.

* * * * *